(12) United States Patent
Lum et al.

(10) Patent No.: US 7,610,416 B2
(45) Date of Patent: Oct. 27, 2009

(54) SYSTEMS AND METHODS FOR CONTROLLING RISE AND FALL TIMES OF USB SIGNALS

(75) Inventors: Richard S. Lum, Redmond, WA (US); Wei Guo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 11/106,191

(22) Filed: Apr. 13, 2005

(65) Prior Publication Data

US 2006/0236003 A1  Oct. 19, 2006

(51) Int. Cl.
  G06F 13/12 (2006.01)
  G06F 13/38 (2006.01)
  H03K 19/0175 (2006.01)
  H03K 19/094 (2006.01)
  G06F 1/00 (2006.01)
  G06F 1/04 (2006.01)
  G06F 1/14 (2006.01)

(52) U.S. Cl. .............. 710/62; 710/71; 326/82; 326/83; 326/86; 713/500; 713/502

(58) Field of Classification Search .......... 710/62, 710/71; 326/82, 83, 86; 713/500, 502
See application file for complete search history.

(56) References Cited

U.S. PATENT DOCUMENTS

| | | | |
|---|---|---|---|
| 6,366,125 B1 * | 4/2002 | Rochard | 326/82 |
| 6,578,156 B1 * | 6/2003 | Sugita | 713/502 |
| 6,731,164 B2 * | 5/2004 | Johnston | 330/85 |
| 6,833,738 B2 * | 12/2004 | Nakada | 327/58 |
| 2003/0101308 A1 * | 5/2003 | Chang et al. | 710/305 |
| 2003/0223486 A1 * | 12/2003 | Hsu | 375/224 |

\* cited by examiner

*Primary Examiner*—Henry W. H. Tsai
*Assistant Examiner*—Tushar S Shah
(74) *Attorney, Agent, or Firm*—Woodcock Washburn LLP

(57) ABSTRACT

Systems and methods for controlling the rise and fall times of USB signals for USB devices and peripherals are provided. The rise and fall times of USB peripherals can be controlled, or changed, in order to match the electrical characteristics of the USB peripheral to a USB host. By sweeping through a range of rise and fall times, and testing the reliability of USB output, optimal rise and fall times for the characteristics of a USB peripheral can quickly be determined. In one embodiment, the controllability of the rise and fall times is provided in firmware that changes at least one characteristic of the USB peripheral that affects the amount of current flowing during USB signaling.

20 Claims, 9 Drawing Sheets

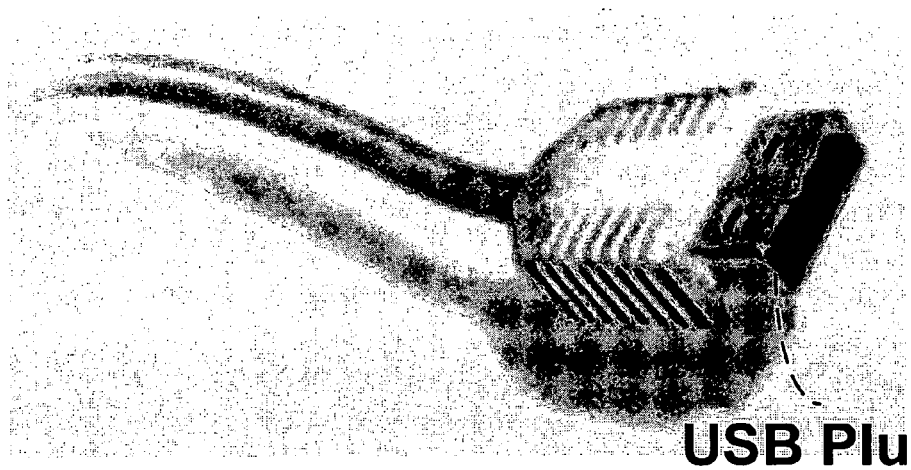
FIG. 1A – Prior Art
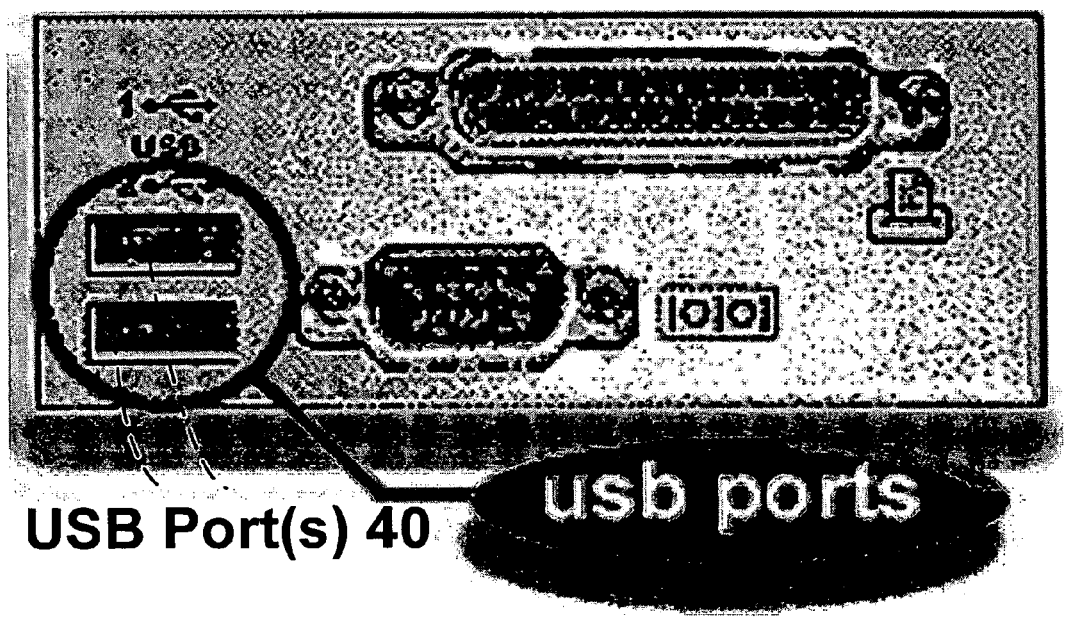
FIG. 1B – Prior Art

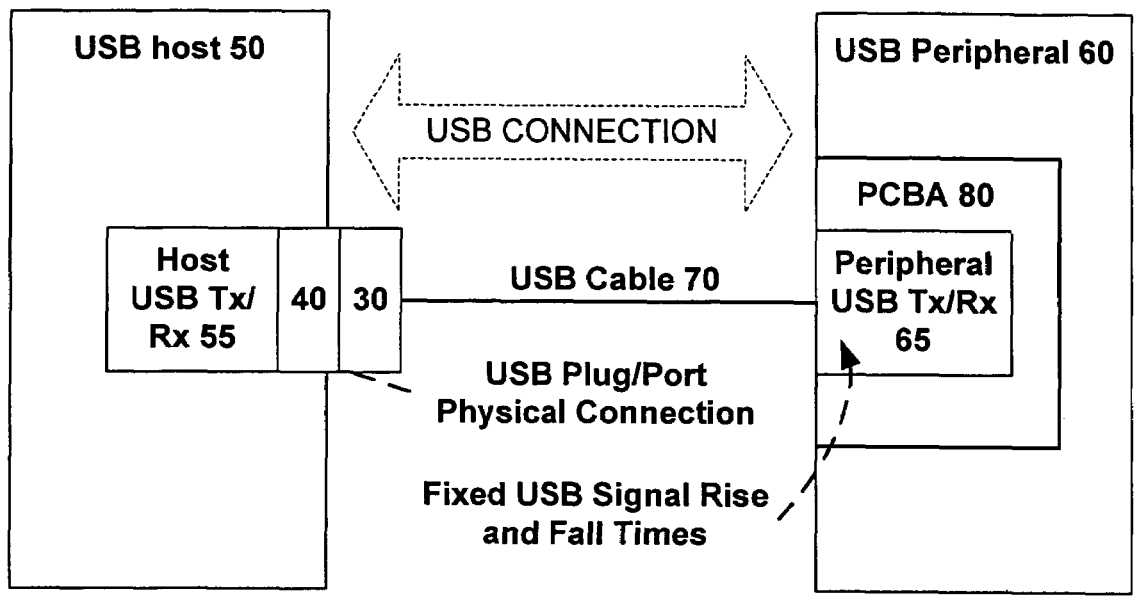
Fig. 1C – Prior Art

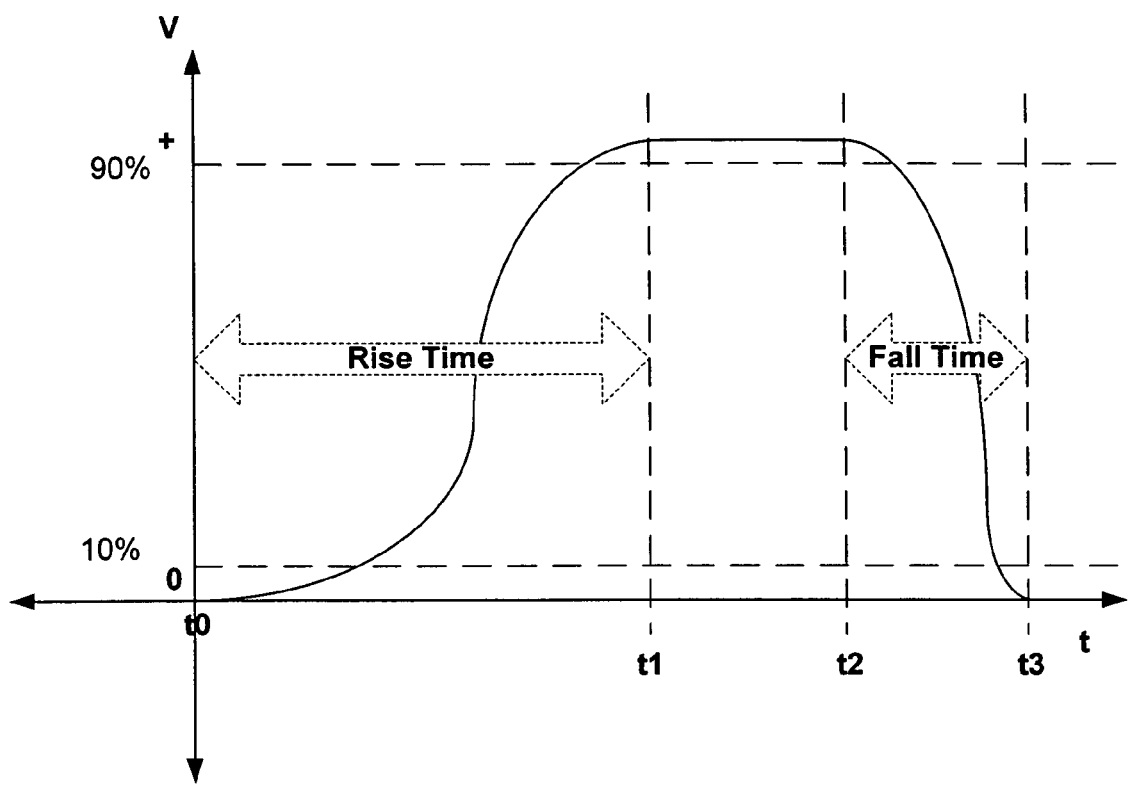
Fig. 1D – Prior Art

SYSTEMS AND METHODS FOR CONTROLLING RISE AND FALL TIMES OF USB SIGNALS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003-2005, Microsoft Corp.

FIELD OF THE INVENTION

The present invention relates to USB peripherals and devices, and more particularly, to systems and methods for controlling the rise and/or fall times of USB signals for USB devices and peripherals.

BACKGROUND OF THE INVENTION

By way of background, Universal Serial Bus (USB) standards, or specifications, endeavor to provide a "universal" plug type for all connections from USB peripherals, such as keyboards, monitors, printers and input devices, e.g., a mouse or a joystick, to host computers, such as PCs, laptops, etc. Virtually every category of PC peripheral is using USB for some products. For illustrative purposes, an exemplary USB plug (male connector) design 30 for a USB peripheral is shown in FIG. 1A and exemplary USB port (female connector) design 40 for the USB standard is shown in FIG. 1B.

Generally speaking, current operating systems (OSs) all support USB, whereas OSs that are no longer supported by their makers may or may not support USB without modifications. Many devices are able to obtain all of the software support they require to operate from the OS, but there are some peripherals that may need extra drivers specialized for that particular peripheral. OSs that support USB know how to determine if any other software is needed and they help the user load any needed software so the device works correctly. USB is currently also a feature of virtually every new notebook computer, gaming systems, and some other mobile computing and entertainment devices as well. One advantage of USB is that it allows portable computer users to easily share peripherals.

USB carries data at the rate of 12 megabits per second, which is sufficient for "medium to low-speed" peripherals. This broad category includes telephones, digital cameras, modems, keyboards, mice, digital joysticks, some CD-ROM drives, tape and floppy drives, digital scanners and specialty printers. USB's data rate also accommodates a whole new generation of peripherals, including MPEG-2 video-base products, data gloves and digitizers. Computer-telephony integration is expected to be a big growth area for PCs, and USB can provide an interface for Integrated Services Digital Network (ISDN) and digital private branch exchanges (PBXs).

High speed USB products have a design data rate of 480 Mb/s. Full speed USB devices signal at 12 Mb/s, while low speed devices use a 1.5 Mb/s subchannel. Comparing USB, for instance, to IEEE-1394 ("1394"), while the two serial buses seem similar, they fulfill different market and cost needs. 1394 has the potential to move more data in a given amount of time, but is considerably more expensive than USB due to its more complex protocol and signaling rate. Applications that are best suited for 1394 are high quality consumer or professional video streams and other high bandwidth entertainment applications, and tend to be for higher end consumer devices. USB tends to be more appropriate for high and low bandwidth computer peripherals, such as mass storage, video, audio, scanners, printers, keyboards, joysticks, etc., i.e., just about any peripheral.

For USB host devices, such as PCs, laptops, gaming systems, and other multimedia host devices, USB is a built-in feature of most host chip sets, as well as operating system and other system software. By eliminating add-in cards and separate power supplies, USB helps make host peripheral devices more affordable than they otherwise would be. In addition, USB's "hot-swapping" capabilities allow business and other users to easily attach and detach peripherals. Device sharing can reduce the cost of ownership of such equipment.

Technically, up to 127 individual USB peripherals can be connected at one time, though due to the fact that some devices reserve USB bandwidth to guarantee their successful operation, the practical maximum of devices is less than the theoretical maximum. However, PCI USB add-in cards can provide an independent USB bus to which even more peripherals can be connected, if need be.

Generally, a cable connects the device to the USB host. In practice, the USB specification limits the length of a cable between full speed devices to 5 meters, or a little under 16 feet 5 inches. For a low speed device, the limit is 3 meters, or about 9 feet, 10 inches. A cable longer than 3 or 5 meters cannot be used because USB's electrical design does not allow it. When USB was designed, a decision was made to handle the propagation of electromagnetic fields on USB data lines in a way that limited the maximum length of a USB cable to something in the range of 4 meters. This method has a number of advantages and since USB is intended for a desktop environment, the range limitations were deemed acceptable in accordance with the limits of transmission line theory.

As a side note, one can achieve lengths longer than 5 meters with USB hubs. With a maximum of 5 hubs connected with 5 meter cables, and a 5 meter cable going to a full speed peripheral device, 30 meters of cable are possible. With a low speed device, a range up to 27 meters can be achieved, depending on the length of the cable to the low speed device.

USB can also be used to connect two or more machines, though it is impractical for more than a trivial number of machines. If you need to connect just a few machines, for instance, USB bridges and a hub or two will work to achieve the goal. USB was not designed to be a local area network (LAN), however, and there are certain safety hazards associated with trying to use USB with large numbers of PCs. There is also a large performance penalty compared to a real LAN.

As mentioned, the hi-speed data transfer rate for USB is 480 Mb/s. There is, however, wide variation in edge rates. With typical line loads, full speed devices usually fall in the 12-25 ns range, and low-speed devices typically range 110-225 ns. For instance, if a 25 ns rise or fall time is used, and it is driven into a 50 pF load, then this would be outside of the USB specifications, i.e., outside the requirements of the USB specifications. If a 25 ns rise or fall time is used, and it is driven into a 1000 pF load, however, then the requirements of the USB specification are met. Thus, the capacitance characteristics of the load can make a significant difference when operating under real conditions. Furthermore, typical or characteristic impedances that should be used when laying out a USB device's traces include 30 ohms to ground and 90 ohms differential between the USB data lines.

USB termination requirements are quite lenient. For example, a 0 to 3.6 V signal input into a 51.75 ohm line with a 28 ohm source termination swings between 4.6 and −1.0 V. In practice, most USB devices are under terminated, and sometimes incorrectly. Using 44 ohms for termination tends to bring termination well within a standard ±15% impedance tolerance, although 44 ohms may not be enough to perfectly terminate the device when it is connected to an ideal cable. Most modern processes are well controlled, so the internal impedance of USB drivers is quite consistent from wafer to wafer, however pre-fixed. It is also wise to characterize the drivers' impedance range and perform sampling of production parts.

The USB cable length limitation was imposed by a cable delay spec of 26 ns to allow for reflections to settle at the transmitter before the next bit is to be sent. Since USB uses source termination and voltage-mode drivers, this is done because otherwise reflections can pile up and blow the driver. This does not mean the line voltage has fully settled by the end of the bit, with the worst case being under termination, however, there has been enough damping by the end of the bit that the reflection amplitude reduces to manageable levels. Similarly, the low speed cable length was limited to 18 ns to keep transmission line effects from impacting low speed signals.

With respect to throughput and bandwidth, USB's actual throughput is a function of many variables. Typically, the most important variables include the target device's ability to source or sink data, the bandwidth consumption of other devices on the bus, and the efficiency of the host's USB software stack. In some cases, peripheral component interconnect (PCI) latencies and processor loading can also be critical.

Assuming only the target endpoint consumes a significant amount of bus bandwidth, and both the target and the host are able to source or sink data as fast as USB can move it, the maximum attainable bandwidth is a function of the transfer type and signaling rate. In practice, most hosts can reach the maximum isochronous and interrupt bandwidths with a single target endpoint. With bulk transfers, typical transfer rates are around 900 kb/s to a single endpoint, increasing to near ideal transfer rates with multiple endpoints.

For devices like most low speed devices (keyboards, mice), latency tolerant bulk devices (printers, scanners, still cameras), or latency intolerant devices with low bandwidth (POTS modems, speakers) bandwidth allocation isn't usually of much concern because the device can tolerate data rates that are a small part of USB's total bandwidth. For higher data rate devices, e.g., video cameras, xDSL modems, etc., the amount of bandwidth available can be critical.

A well-designed peripheral handles a shortage of bandwidth gracefully. For instance, many USB cameras provide several different interfaces, each using a different amount of isochronous bandwidth, and allow the user to select which interface is used. Thus, the user can choose whatever tradeoff between available bus bandwidth and frame rate best suits their needs. Another example is a bulk device that requires a certain number of packets per frame to work correctly. An application could monitor the data transfer rate, notify the user if the data rate became too low, and suggest ways to bring it back up.

As a general rule of thumb, a device should be able to operate with as little as 30 to 40% of the bus's total bandwidth. This allows two relatively high bandwidth devices to work together (such as a DSL modem and video camera in a teleconferencing setup) while still leaving bandwidth available for must-have devices like keyboards and mice.

Having set forth exemplary background concerning the operation of USB devices with a USB host, an exemplary prior art system is illustrated in FIG. 1C. As shown, an exemplary USB peripheral 50 is connected to a USB host 50 via USB cable 70 of peripheral 50 having a male USB connector plug 30 inserted into a female USB connector port 40 of host 50. USB host includes a host USB transmit and receive component 55 that is capable of receiving, interpreting and transmitting USB messages back and forth between host 50 and peripheral 60. Similarly, peripheral 60 includes a peripheral USB transmit and receive component 65 that is capable of receiving, interpreting and transmitting USB messages back and forth between host 50 and peripheral 60. Transmit and Receive component 65 of peripheral 60 is typically implemented on chip of a larger printed circuit board assembly 80 of peripheral 60.

A problem with designing USB peripherals today, however, is that the USB signal rise and fall times of the peripheral must be matched with the characteristics and length of the cable 70 to be used with peripheral 60 and the load to be manifested by the peripheral when placed across the connection. One problem is that if these characteristics are not matched properly, electromagnetic interference (EMI) can significantly impact the performance of the signaling on the USB connection. For instance, harmonics of signals can propagate through a messaging sequence and interfere with the quality of the signal being processed, introducing potential problems with interpretation of the signal. For instance, with a current joystick product, moving from mere 3 meters to a 5 meter cable causes communications to become too slow from the device, and thus too slow for processing, to make the communications useful.

Traditionally, to make an initial match, designers of USB peripherals have had to spend unnecessary cycles manually tweaking and matching the load and cable characteristics of the peripheral in order to fall within the appropriate rise and fall times to ensure the signaling reliability characteristics mandated for USB connections. What is meant by a signal "rise time" and "fall time" is illustrated in exemplary fashion for the hypothetical signal of FIG. 1D. As the signal rises to maximum voltage (logical 1), a time is associated with that rise termed the "rise time." As the signal falls to minimum voltage (logical 0), a time is associated with that fall termed the "fall time." The starting points and end points for rise and fall times are selected according to different points and mathematical formula, since signals tend to asymptotically reach maximums and minimums, and thus, no one definition of rise time or fall time makes sense for all cases. For instance, half-power points, or ¼ voltage points, or 10% may be selected as starting and end points, however, the basic concept remains the same: however defined, the rise time is the time it takes a signal to rise from a beginning voltage (usually logical 0) to an ending voltage (usually logical 1) and the fall time is the time it takes a signal to fall from a starting voltage (usually logical 1) to an ending voltage (usually logical 0). Thus, it would be desirable to build in a way to control, or dynamically change, the rise and fall times of USB signals for USB peripheral devices to overcome the problems presently associated with fixed, or unchangeable, rise and fall times hardwired into present USB peripheral devices.

SUMMARY OF THE INVENTION

In view of the foregoing, the present invention provides systems and methods for controlling the rise and fall times of USB signals for USB devices and peripherals. In accordance with the invention, the rise and fall times of USB peripherals can be controlled, or changed, in order to match the electrical characteristics of the USB peripheral to a USB host. By sweeping through a range of rise and fall times, and testing the reliability of USB output, optimal rise and fall times for the characteristics of a USB peripheral can quickly be determined. In one embodiment, the controllability of the rise and fall times is provided in firmware that changes at least one characteristic of the USB peripheral that affects the amount of current flowing during USB signaling. In one non-limiting embodiment of the invention, the USB peripheral device is a gaming controller, though any USB peripheral device may benefit from the systems and methods of the invention.

Other features of the present invention are described below.

BRIEF DESCRIPTION OF THE DRAWINGS

The system and methods for controlling USB rise and fall times are further described with reference to the accompanying drawings in which:

FIGS. 1A and 1B represent exemplary USB plugs and ports, respectively, for creating a USB connection found in the prior art;

FIG. 1C is an exemplary block diagram showing the fixed aspect of prior art designs for implementing fixed USB rise and fall times in USB peripherals and devices;

FIG. 1D is an exemplary illustration showing the concepts of rise time and fall time in accordance with the invention;

DETAILED DESCRIPTION OF ILLUSTRATIVE EMBODIMENTS

Overview

As mentioned in the background, present day USB chips for receiving, processing, interpreting and transmitting USB commands have a pre-programmed, or fixed, rise and fall time for USB signals built into the silicon. However, prior to shipping any USB device, the nature of pre-programming, or fixing, the rise and fall time of the chip is such that the USB peripheral device designer(s) must spend many hours tweaking and changing the printed circuit board assembly (PCBA) design with various component value changes, testing the reliability of each change independently, to ensure that the component values are selected in a way that best meets the USB specification for the system. This increase in development time results in slower shipping times, and in some cases, performance may be suboptimal if the designers have not exhaustively tested different component values.

While it is possible to place a load on the outside of the USB peripheral as a way of changing the signaling characteristics of the USB peripheral after the device has shipped, such a fix is painful from a consumer standpoint because it means that the USB peripheral has been shipped with suboptimal signaling characteristics, and it also means that the peripheral manufacturer must have some way of reaching the consumer so that the external load that can provide better signaling characteristics of the device can be included. Either way, the inclusion of an external load adds cost to the manufacturer and inconvenience to the consumer, and thus alternative easier ways of setting the USB signaling characteristics of USB peripherals are desired.

Programmable USB Rise and Fall Time

In consideration with the problems of tedious tweaking of component values in order to define pre-fixed USB signal rise and fall times for present USB peripherals and devices, the invention enables the programming of USB rise and fall times via firmware so that the iterative hardware adjustment is eliminated. In one embodiment, the invention provides the ability to program USB signal rise and fall times via an electrically erasable and programmable read only memory (EEPROM) when using the chip in connection with various printed circuit board assembly (PCBA) designs. By allowing for direct and fast determination of a default, optimal set of component values for setting initial USB signal rise and fall times, the amount of time needed to turn around board "spins" (i.e., from design on paper to printed circuit board) is greatly reduced.

Figure 3:
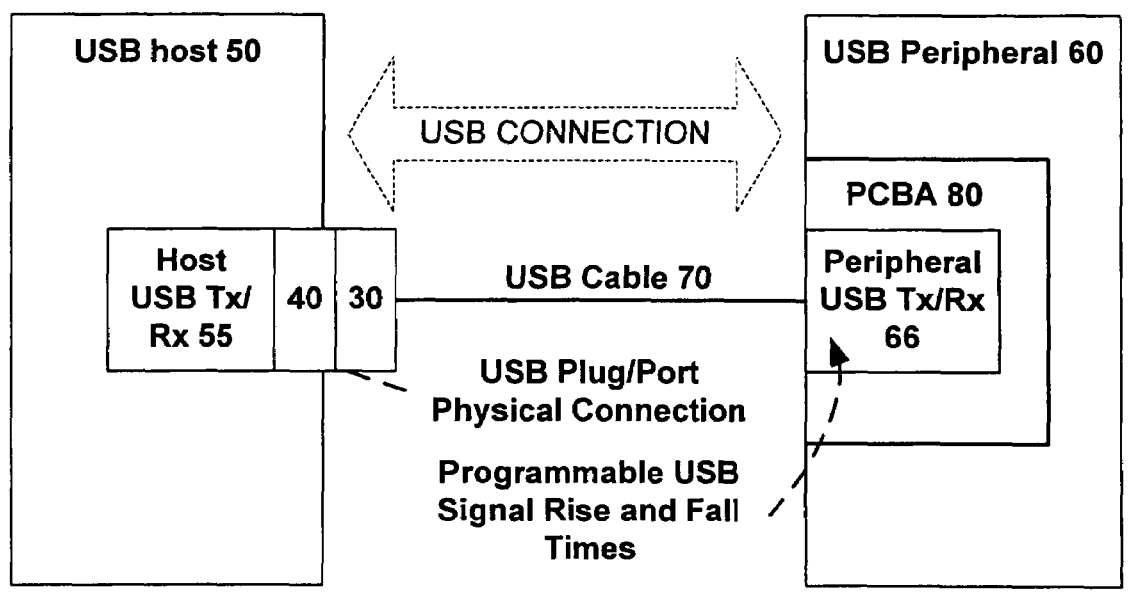
FIG. 3 is a block diagram showing exemplary control of the rise and fall times for USB signals in accordance with the invention.

As illustrated in FIG. 3, an exemplary USB peripheral 50, such as a wired controller, camera, memory unit, force feedback joystick, key port, microphone, etc. is connected to a USB host 50, such as a PC, laptop, set top box, gaming or multimedia console, etc. via USB cable 70 of peripheral 50 having a male USB connector plug 30 inserted into a female USB connector port 40 of host 50. USB host includes a host USB transmit and receive component 55 that is capable of receiving, interpreting and transmitting USB messages back and forth between host 50 and peripheral 60. Similarly, peripheral 60 includes a peripheral USB transmit and receive component 65 that is capable of receiving, interpreting and transmitting USB messages back and forth between host 50 and peripheral 60. Transmit and receive component 66 of peripheral 60 is typically implemented on chip of a larger printed circuit board assembly 80 of peripheral 60. In the embodiment of FIG. 3, however, the rise and fall times for USB signals being communicated through transmit and receive component 66 are controllable. In various embodiments, the invention programmably changes via firmware the amount of current that is associated with USB signals by changing at least one path through the silicon comprising the component 66. For instance, in one embodiment, the programmability is implemented via EEPROM chip technology, such that the ability to change the rise and fall times associated with signaling through the chip may be changed at the direction of the firmware by changing one or more signaling paths, or component values, that affect one or more current parameters, such as load (resistance), capacitance, voltage, etc., i.e., any parameter that affects whether more or less current is introduced for the USB signals.

In one non-limiting embodiment, the invention provides the programmatic ability to change how much current is placed on the transmitter of the USB peripheral 60, whereas in other embodiments, the invention provides the programmatic ability to change how much current is received by the receivers of the USB peripheral 60. Advantageously, the invention thus provides USB communications with greater tolerance for unreliable messaging through intelligent electronics because the rise and fall times of the USB peripheral can be controlled without redesigning the silicon from scratch since the ability to alter current characteristics is built into the peripheral. Accordingly, the invention gives the ability to determine a default set of characteristics that provide reliable USB messaging.

Figure 4A:
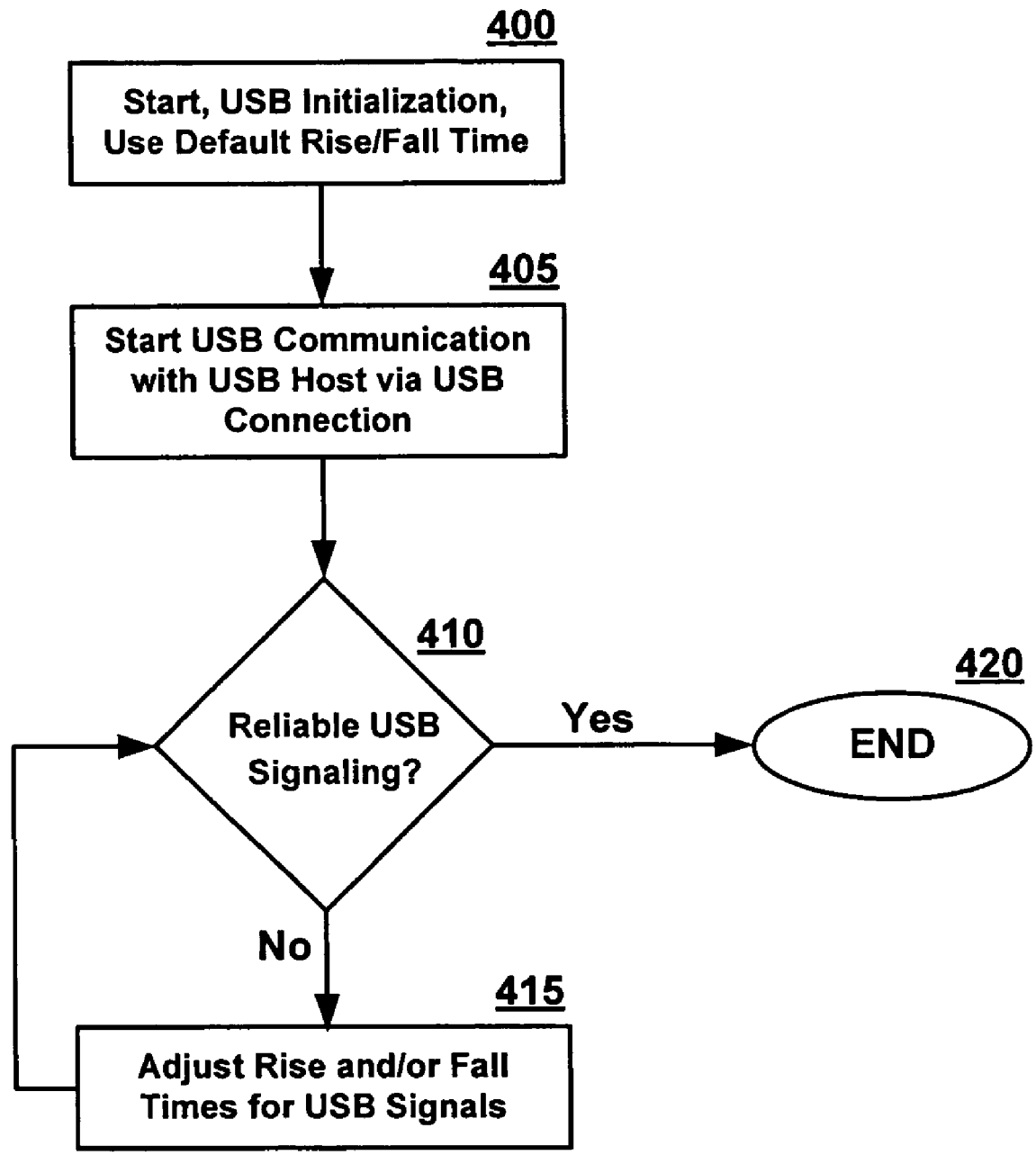
FIGS. 4A and 4B are exemplary, non-limiting flow diagrams showing exemplary control of the rise and fall times for USB signals in accordance with the invention.

Thus, as illustrated in the exemplary, non-limiting flow diagram of FIG. 4A, at 400, at initialization of the USB connection, a default set of characteristics for setting the rise and/or fall times of the USB peripheral, which default set is determined at development time by sweeping through a variety of characteristics and determining an optimal set, is initially used to set the default rise and/or fall times of the USB peripheral. At 405, communication begins with the USB host via the USB connection. At 410, as long as reliable messaging is occurring with the USB signals between the USB peripheral and USB host, then the default set of characteristics is used, and the flow may proceed properly to 420 since there are no changes necessary. If the default set is or becomes unreliable at 410, however, then at 415, the invention enables the rise and/or fall times for USB signaling to be programmatically changed until reliable USB signaling is achieved once again.

Figure 4B:
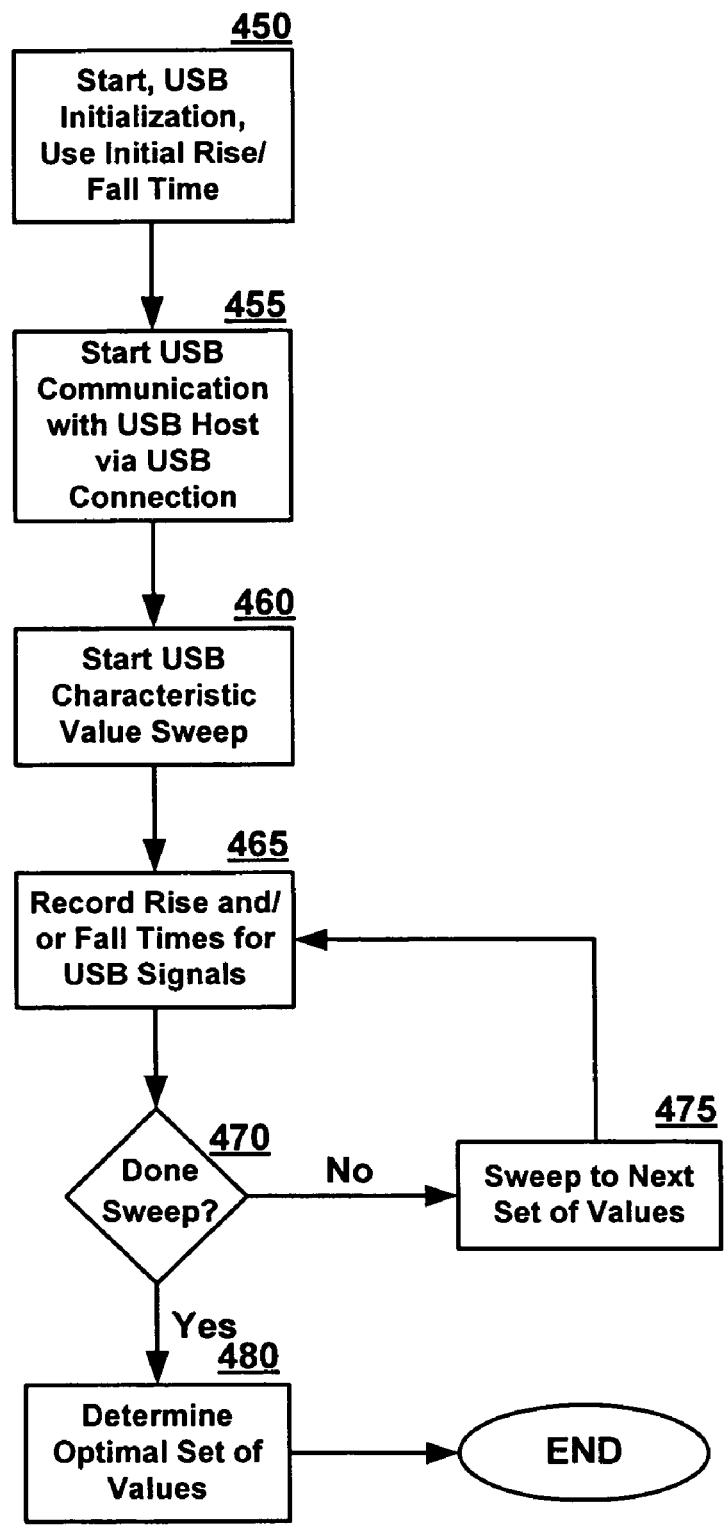

FIG. 4B illustrates how the invention can be used on the development side to achieve a default set of characteristics for use when connecting a USB peripheral under design to a USB host. At 450, some initial set of characteristics is used for setting the rise and fall times for USB signals to the USB peripheral being designed. At 455, the USB peripheral under design is connected to a USB host to start a USB connection with the USB peripheral. At 460, the invention operates to sweep through a variety of characteristics that have an impact on the amount of current delivered to or transmitted by the USB transmitter/receiver component of the USB peripheral, e.g., the path through the silicon may be changed to pass through more or less resistance, or capacitance, or the voltage of the USB peripheral may be raised or lowered. At each step of the sweeping way, at 465, a determination with respect to the reliability of the messaging vis-à-vis the rise and/or fall times for the USB signals for a given set of characteristics of the sweep. If the sweep is not done at 470, the rise and fall times for USB signals are adjusted to a next set of values at 475, and the flow returns to 465 to record the results of each successive set of characteristics until the sweep is done. At 480, when the sweep is done, the system is armed with enough information to make a determination as to a best set of characteristics to use for USB signal rise and/or fall times for the USB peripheral. Such default time may be used, for instance, at startup or initialization of any USB connection for the USB peripheral in use.

As described in FIG. 4A, automatic adjustments may be made to the USB signaling to improve reliability of the USB messages between a USB peripheral and USB host during operation of the USB connection. A more specific, non-limiting embodiment, of real-time operation of the invention for a USB peripheral is shown in the exemplary, non-limiting flow diagram of FIG. 5.

Figure 5:
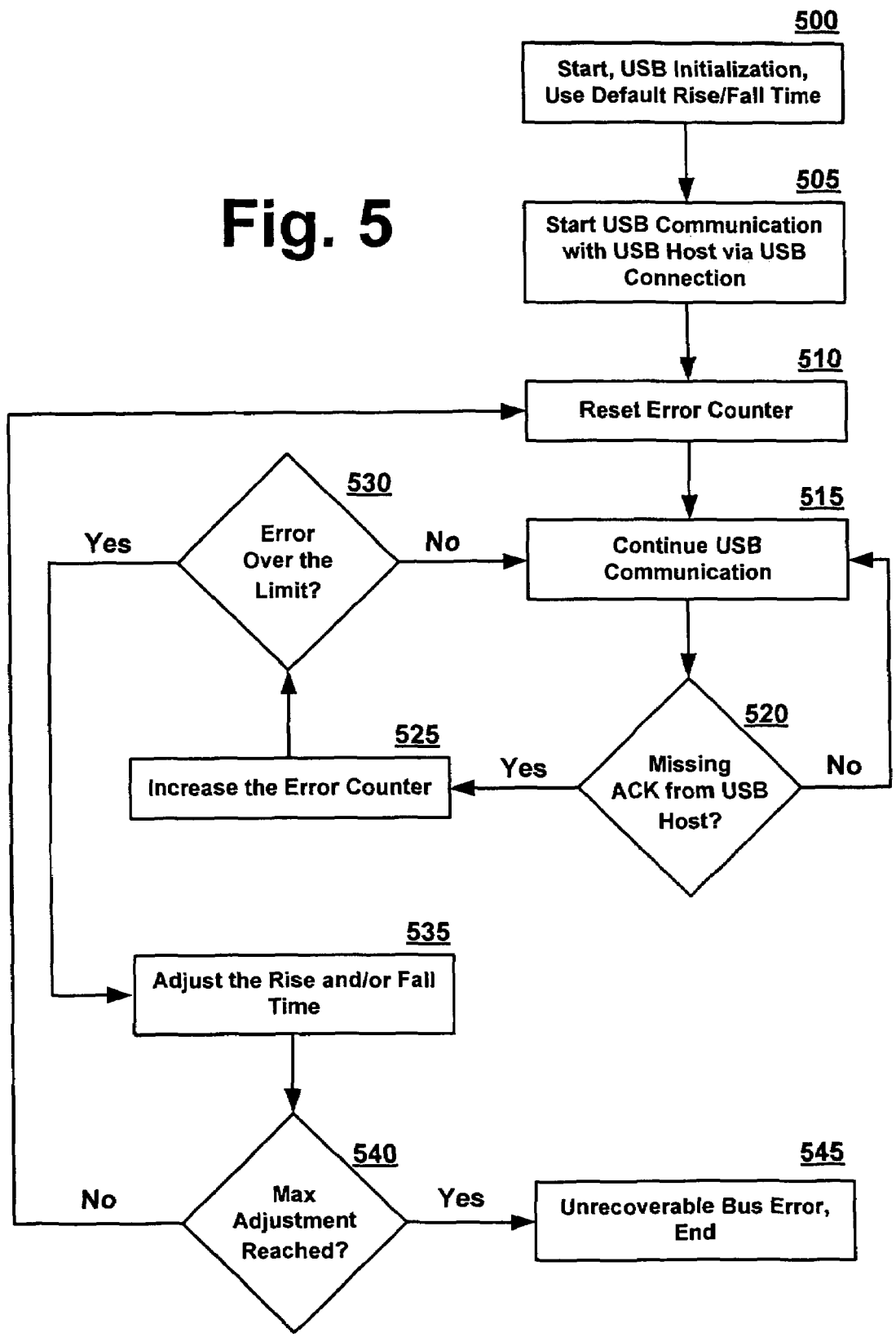
FIG. 5 is an exemplary, non-limiting flow diagram showing exemplary control of the rise and fall times for USB signals in a more detailed embodiment of the invention.

In FIG. 5, at 500, the USB peripheral is initialized when connected to a USB host, at which time a default set of USB signaling rise and fall time characteristics are used for the USB peripheral, e.g., as determined by a process such as the process shown in FIG. 4B. At 505, USB communications commence between the USB host and USB peripheral via the USB connection. At 510, an error counter is set, or reset. At 515, USB communications continue, such that an acknowledge (ACK) signal is expected in return from the USB host in response to a USB message transmission from the USB peripheral. At 520, if the ACK signal has been received, then USB communication is behaving reliably and the communication continues.

If the ACK signal is missing, however, it is not necessarily certain that the USB peripheral is behaving unreliably. For instance, a power surge could temporarily inhibit the accuracy of signaling by the USB peripheral. Thus, where the ACK signal is determined missing at 520 after a pre-defined timeout, at 525, the error counter is increased. If the error counter is not over a pre-defined threshold number at 530 (small number of ACKs missed), then the flow returns to 515 to continue with USB communication, and to retry using the same rise and fall time characteristics. If, however, the ACK signal has been missed a certain number of times at 530, the invention assumes that unreliable USB messaging is occurring, and proceeds to 535. At 535, the rise and/or fall times of the USB signaling are adjusted in order to try to correct the messaging failure, and as long as new adjustments can be made (i.e., as long as adjustments are not repeated) at 540, then the flow proceeds to 510 to reset the error counter and try USB communications again at the new rise and fall times. If at 540, all adjustments and variations of adjustments (e.g., permutations and combinations where multiple parameters are being varied) are exhausted, i.e., have been attempted, but still result in unreliable USB messaging, then an unrecoverable bus error has occurred, and the USB peripheral is dysfunctional.

In the embodiments of the invention, therefore, the developer benefits from the programmability of the USB rise and/or fall time because the developer need not wait for any silicon to be placed in the USB peripheral to return fully baked or soldered to test the USB signaling characteristics, since it may be assumed that the programmatic functionality introduced via software of firmware of the invention will help find the appropriate default characteristics for the device. For instance, a development tool or application associated with the flow of FIG. 4B can visually display the results of the sweep, and indicate to the developer the best default characteristics for the USB peripheral. The invention also helps the user, or consumer, of the USB peripheral device as well. Just because an optimal set of default characteristics might be chosen in a laboratory doesn't mean that the conditions will exactly match up to the conditions presented to the consumer. For instance, the consumer might extend the cable, or pass the USB signals through a path with different electrical or environmental characteristics that don't approximate those in the lab. For whatever reason, if the default rise and fall times selected are not providing reliable signaling for USB communications to the peripheral, the various embodiments of the invention may be used in real-time to self-diagnose that unreliable messaging is occurring and attempt to fix the problem by adjusting rise and/or fall times for USB signals, without the cumbersome need to attach an external load to the device.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for controlling USB signal rise and fall times in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for controlling USB signal rise and fall times of the invention.

Figure 2A:
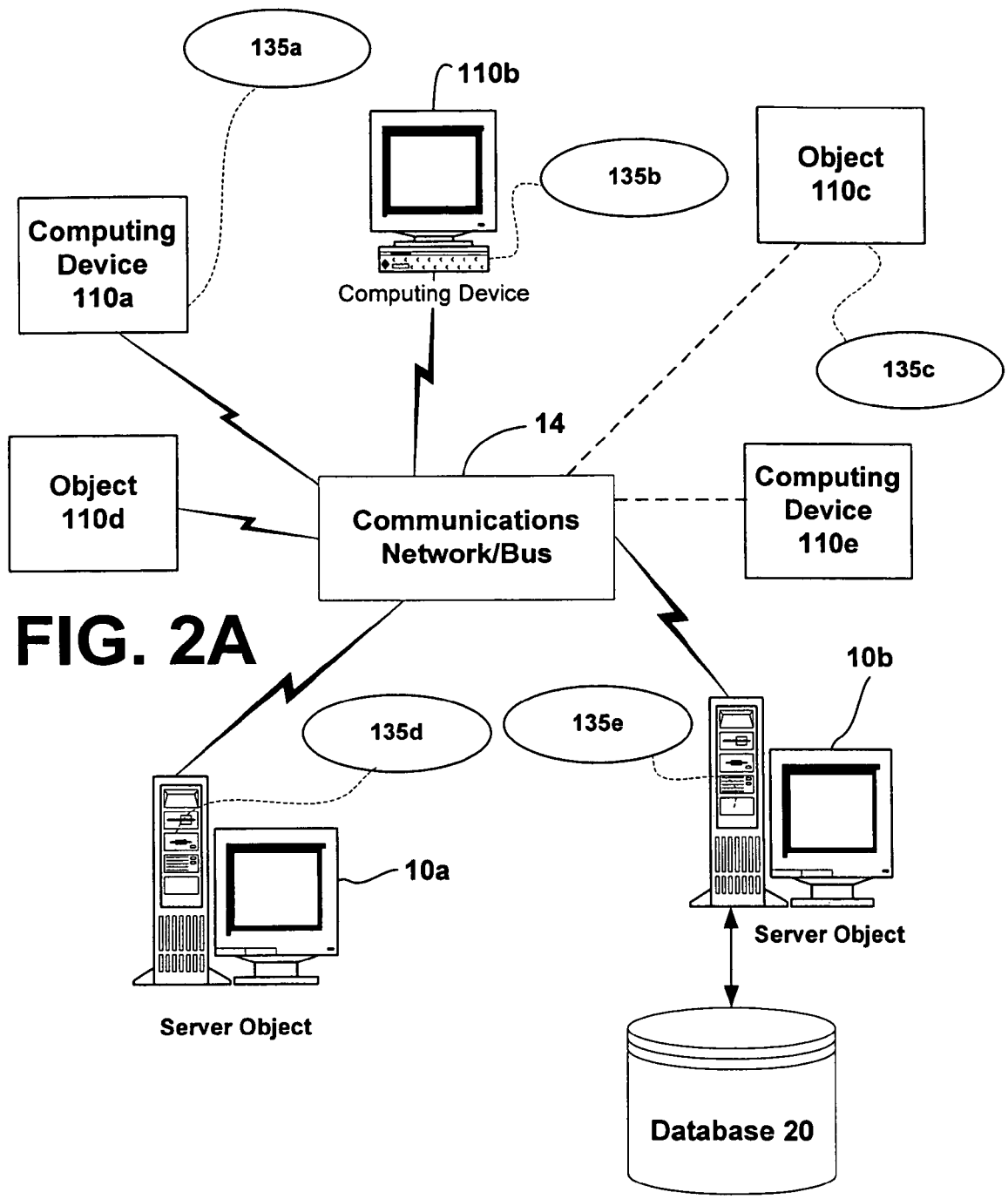
FIG. 2A is a block diagram representing an exemplary network environment in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use with the systems and methods for controlling USB signal rise and fall times in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to controlling USB signal rise and fall times according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed or utilized incident to program objects, which is used pursuant to controlling USB signal rise and fall times in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 2A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate the need to control USB signal rise and fall times in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for controlling USB signal rise and fall times of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other.

The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to use USB peripherals and devices.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control of the device. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
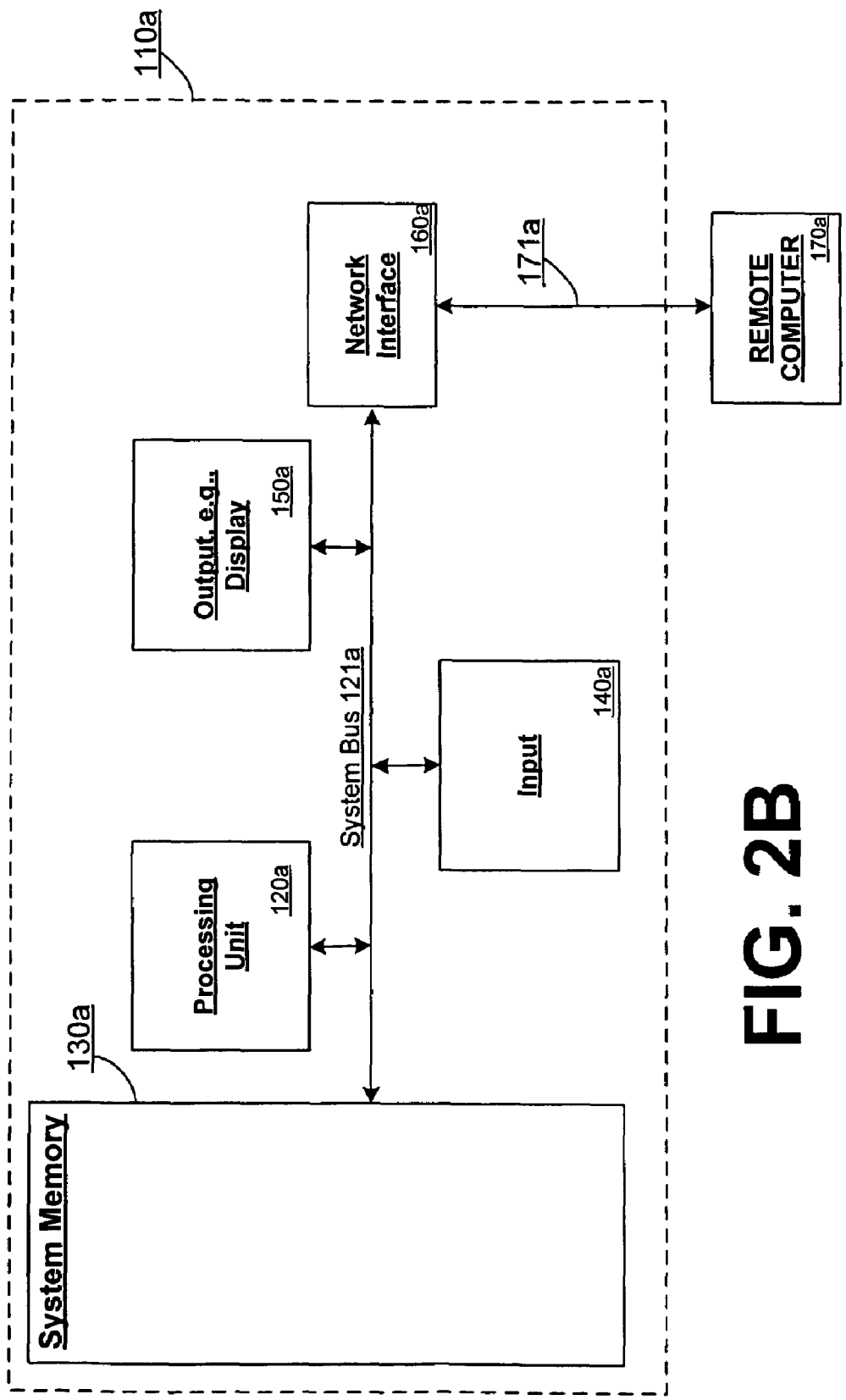
FIG. 2B is a block diagram representing an exemplary non-limiting computing system environment in which the present invention may be implemented.

As mentioned, the invention applies to any device wherein it may be desirable to use USB peripherals and devices in connection with a host machine. It should be understood, therefore, that handheld, portable and other computing devices and computing objects of all kinds are contemplated for use in connection with the present invention, i.e., anywhere that a device may establish a USB connection. Accordingly, the below general purpose remote computer described below in FIG. 2B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, aspects of the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2B thus illustrates an example of a suitable computing system environment 100a in which the invention may be implemented, although as made clear above, the computing system environment 100a is only one example of a suitable computing environment for a USB device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 2B, an exemplary host device to which a USB peripheral may be connected in accordance with the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2B include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

There are multiple ways of implementing the present invention, e.g., an appropriate API, tool kit, driver code, operating system, control, standalone or downloadable software object, etc. which enables the use of the systems and methods for controlling USB rise and/or fall times in accordance with the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to control rise and fall times. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the programmable USB signal rise and/or fall times of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for controlling USB rise and/or fall times. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for controlling at least one of a rise and fall times of universal serial bus (USB) signals in a USB silicon device, comprising:
    establishing a USB connection between the USB silicon device and a USB host to communicate USB signals between the USB silicon device and the USB host;
    monitoring communications over said USB connection;
    automatically determining a measure of reliability of communications over said USB connection to identify an optimal rise time and fall time for said USB silicon device, wherein said determining includes initializing an error counter, increasing said error counter each time an expected ACK signal is not received and determining whether said error counter exceeds a pre-defined threshold; and wherein,
        if said pre-defined threshold is exceeded, ceasing communication between said USB host and said USB silicon device and dynamically and automatically changing, via software and based on said determined measure of reliability, at least one signal path through the USB silicon device that affects at least one of a rise time and a fall time for said USB signals at least one of received by or transmitted from the USB silicon device, else
        allowing said USB host and said USB silicon device to continue communicating.

2. A method according to claim 1, wherein said changing includes changing said at least one signal path to affects the amount of current utilized for said USB signals at least one of received by or transmitted from the USB device.

3. A method according to claim 1, wherein said changing includes changing said at least one signal path to affect at least one of a resistance and capacitance value encountered by said USB signals at least one of received by or transmitted from the USB device.

4. A method according to claim 1, wherein said changing includes changing said at least one signal path to affect a voltage for said USB signals at least one of received by or transmitted from the USB device.

5. A method according to claim 1,
    wherein said determining a measure of reliability of communications over said USB connection includes determining whether said at least one signal path and associated rise time and fall time for USB signals at least one of received by or transmitted from the USB device provide reliable USB messaging between said USB device and said USB host.

6. A method according to claim 5, further comprising:
    if said at least one signal path and associated rise time and fall time for USB signals at least one of received by or transmitted from the USB device do not provide reliable USB messaging, performing said changing.

7. A method according to claim 5, wherein said determining a measure of reliability includes determining whether at least one ACK signal was not received from the USB host in response to a USB message from the USB device that requests an ACK signal.

8. A computer readable storage medium comprising computer executable interface modules having computer executable modules for performing the method of claim 1.

9. A computing device including means for performing the method of claim 1.

10. A universal serial bus (USB) silicon device, comprising:
    at least one chip for handling the reception and transmission of USB signals from and to a USB host via a USB connection formed between said USB host and the USB silicon device, wherein the at least one chip includes a plurality of software programmable signal paths for dynamically altering, via software and based on an automatically determined measure of reliability of communications over said USB connection, at least one of a rise and fall time for USB signals at least one of received from or transmitted to said USB host, wherein at least one of said USB host and the USB silicon device is configured to alter said rise and fall time over a range of values, test reliability of said USB signal and determine an optimal rise and fall time of the USB silicon device.

11. A USB device according to claim 10, wherein said at least one programmable signal path, when changed, alters the amount of current associated with said USB signals at least one of received from or transmitted to said USB host.

12. A USB device according to claim 10, wherein said at least one programmable signal path, when changed, alters at least one of a voltage, capacitance or resistance associated with the at least one chip.

13. A USB device according to claim 10, wherein said at least one programmable signal path is initially set to a default programmable signal path determined by automatically sweeping through a plurality of said at least one programmable signal path and selecting the optimal programmable signal path as said default set.

14. A USB device according to claim 10, wherein firmware of the USB device automatically adjusts said at least one programmable signal path when the USB signals passed between said USB device and said USB host are determined to be unreliable.

15. A USB silicon device having controllable rise and/or fall times for universal serial bus (USB) signals, comprising:

means for establishing a USB connection between the USB silicon device and a USB host to communicate USB signals between the USB silicon device and the USB host;

means for monitoring communications over said USB connection;

means for automatically determining a measure of reliability of communications over said USB connection; and means for dynamically adjusting at least one signal path, via software and based on said determined measure of reliability, that affects at least one of a rise time and a fall time for said USB signals at least one of received by or transmitted from the USB silicon device, wherein said means for dynamically adjusting is configured to sweep through a range of rise and fall times and wherein said means for automatically determining is configured to automatically determine a measure of reliability of communication for each said rise time and fall time in said range of rise and fall times to determine an optimal rise time and fall time for said USB silicon device.

16. A USB device according to claim 15, wherein said means for adjusting includes means for adjusting at least one signal path that affects the amount of current utilized for said USB signals at least one of received by or transmitted from the USB device.

17. A USB device according to claim 15, wherein said means for adjusting includes means for adjusting at least one of a resistance, capacitance and voltage value associated with said USB signals at least one of received by or transmitted from the USB device.

18. A USB device according to claim 15, further comprising:

means for determining whether said at least one signal path and associated rise time and fall time for USB signals at least one of received by or transmitted from the USB device provide reliable USB messaging between said USB device and said USB host.

19. A USB device according to claim 18, wherein said means for determining a measure of reliability includes means for determining whether at least one ACK signal was not received from the USB host in response to a USB message from the USB device.

20. A method for determining at least one of an optimal rise and an optimal fall time of a universal serial bus (USB) signal, comprising:

establishing a USB connection between a USB device and a USB host to communicate the USB signal between the USB device and the USB host, wherein the USB device includes at least one silicon based chip for handling the reception and transmission of the USB signal to and from the USB host and wherein the at least one chip includes a plurality of USB signal paths through the chip;

monitoring communications over said USB connection;

for a range of rise and fall times, dynamically and automatically selecting, via software, at least one of the plurality of signal paths through the chip to affect at least one of a rise time and a fall time of the USB signal; and automatically determining a measure of reliability of communications over said USB connection for each of said at least one of said rise time and fall time within said range of rise and fall times to identify an optimal rise and fall time for said USB connection.

* * * * *

UNITED STATES PATENT AND TRADEMARK OFFICE
CERTIFICATE OF CORRECTION

| | |
|---|---|
| PATENT NO. | : 7,610,416 B2 |
| APPLICATION NO. | : 11/106191 |
| DATED | : October 27, 2009 |
| INVENTOR(S) | : Richard S. Lum et al. |

It is certified that error appears in the above-identified patent and that said Letters Patent is hereby corrected as shown below:

In column 15, line 65, in Claim 2, delete "affects" and insert -- affect --, therefor.

Signed and Sealed this
Eighth Day of February, 2011

David J. Kappos
*Director of the United States Patent and Trademark Office*